(12) United States Patent
Kamikubo

(10) Patent No.: US 6,185,027 B1
(45) Date of Patent: Feb. 6, 2001

(54) MONITORING OPTICAL SYSTEM FOR SCANNING OPTICAL DEVICE

(75) Inventor: Junji Kamikubo, Tokyo (JP)

(73) Assignee: Asahi Kogaku Kogyo Kabushiki Kaisha, Toyko (JP)

( * ) Notice: Under 35 U.S.C. 154(b), the term of this patent shall be extended for 0 days.

(21) Appl. No.: 09/484,438

(22) Filed: Jan. 18, 2000

(30) Foreign Application Priority Data

Jan. 19, 1999 (JP) .................................................. 11-010546

(51) Int. Cl.⁷ .................................................. G02B 26/08
(52) U.S. Cl. .......................... 359/207; 359/205; 359/216; 359/217
(58) Field of Search .................................. 359/205–207, 359/212–219

(56) References Cited

U.S. PATENT DOCUMENTS

| | | |
|---|---|---|
| 5,572,353 | 11/1996 | Iizuka et al. . |
| 5,621,562 | 4/1997 | Hama . |
| 5,748,354 | 5/1998 | Iizuka . |
| 5,825,403 | 10/1998 | Iima et al. . |
| 5,898,514 | 4/1999 | Okamoto . |

*Primary Examiner*—James Phan
(74) *Attorney, Agent, or Firm*—Greenblum & Bernstein P.L.C.

(57) ABSTRACT

A monitoring optical system of the present invention is used in a scanning optical device in which a deflected laser beam by a polygonal mirror is separated from an incident laser beam in an auxiliary scanning direction, and the deflected laser beam is converged onto a drawing surface through a curved surface mirror and a drawing anamorphic lens, which corrects an effect of skew of the laser beam. The monitoring optical system includes a monitoring cylindrical lens for converging a monitor beam separated from the deflected laser beam without passing the drawing anamorphic lens, and a monitoring sensor for detecting the monitor beam converged by the monitoring cylindrical lens to generate synchronizing signal. A main meridian that indicates a main refractive power of the monitoring cylindrical lens is inclined with respect to a z-direction on a plan perpendicular to the monitor beam so that wavefront aberration on the monitoring sensor is minimized. The z-direction is perpendicular to a scanning direction of the monitor beam on the plane.

10 Claims, 5 Drawing Sheets

FRONT OF SENSOR (2mm)   ON SENSOR   REAR OF SENSOR (2mm)

W=0.0deg

W=20.0deg

W=43.0deg

W=47.0deg

PRIOR ART    PRIOR ART    PRIOR ART

FRONT OF SENSOR    ON SENSOR    REAR OF SENSOR
(2mm)                           (2mm)

MONITORING OPTICAL SYSTEM FOR SCANNING OPTICAL DEVICE

BACKGROUND OF THE INVENTION

The present invention relates to a monitoring optical system, which is applicable to a scanning optical device such as a laser printer, for detecting a drawing-start timing or a drawing-end timing per scan. Particularly, the present invention relates to the monitoring optical system for the scanning optical device in which a laser beam deflected by a deflector is separated from a laser beam incident thereon in an auxiliary scanning direction.

U.S. Pat. No. 5,621,562 discloses the scanning optical device that has such an arrangement of the deflected laser beam separated from the incident laser beam.

FIG. 4 is a perspective view of the scanning optical device disclosed in the U.S. patent. A laser beam emitted by a semiconductor laser 10 passes through a collimator lens 11 and a cylindrical lens 12 and is reflected by a flat mirror 13 to be incident on a polygonal mirror (deflector) 14. The deflected laser beam by a reflection surface 14a of the polygonal mirror 14 is reflected by a curved surface mirror 15 and forms a beam spot on a photoconductive drum 18 (shown by two-dot chain line) through a drawing anamorphic lens 16 and an optical path bending mirror 17.

The beam spot scans on the photoconductive drum 18 as the polygonal mirror 14 rotates.

In this specification, a direction equivalent to the scanning direction of the beam spot on the photoconductive drum 18 is referred to as a main scanning direction, a direction perpendicular to the main scanning direction is referred to as an auxiliary scanning direction.

The laser beam at the surface of the photoconductive drum 18 is the reference point for defining the direction of the optical power of the optical elements. That is, the power in the main scanning direction means the power contributing to converge or diverge the laser beam in the main scanning direction at the drum 18. The power in the auxiliary scanning direction means the power which contributes to converge or disperse the laser beam in the auxiliary scanning direction at the drum 18.

The laser beam deflected by the polygonal mirror 14 is separated from the laser beam incident thereon in the auxiliary scanning direction, i.e., a direction of a rotation axis 14b of the polygonal mirror 14. Further, the laser beam reflected by the curved surface mirror 15 is also separated from the laser beam incident thereon in the auxiliary scanning direction.

The cylindrical lens 12 has a positive refractive power only in the auxiliary scanning direction for forming a line-spread image near the polygonal mirror 14. The curved surface mirror 15 primarily has a positive power in the main scanning direction and the drawing anamorphic lens 16 primarily has a positive power in the auxiliary scanning direction.

A monitoring flat mirror 40 is located between the curved surface mirror 15 and the drawing anamorphic lens 16. The monitoring flat mirror 40 separates a monitor beam from the deflected laser beam at a separation point outside of the scanning range. When the laser beam reflected by the curved surface mirror 15 reaches the end of the scanning range, the laser beam is reflected by the monitoring flat mirror 40 and is converged onto a monitoring sensor 42 through a monitoring cylindrical lens 41. The monitoring sensor 42 generates a synchronizing signal to indicate the drawing-start timing of each scan in response to each detection of the monitor beam.

The laser beam reflected by the curved surface mirror 15 is converged in the main scanning direction, but is diverged in the auxiliary scanning direction, so it is re-converged by the monitoring cylindrical lens 41 in the auxiliary scanning direction to form a spot on the monitoring sensor 42.

In FIG. 4, a y-direction and a z-direction are defined in a plane P that is perpendicular to the monitor beam incident on the monitoring sensor 42. The y-direction is a scanning direction of the monitor beam on the plane P and the z-direction is perpendicular to the y-direction on the plane P. When the main meridian of the monitoring cylindrical lens 41 is projected onto the plane P, the direction of the main meridian N is parallel to the z-direction. The main meridian is perpendicular to a generatrix of the monitoring cylindrical lens 41 and indicates a direction of main refractive power thereof.

The laser beam is incident on the polygonal mirror 14 with an inclination in the auxiliary scanning direction, which causes a skew distortion in the deflected laser beam when a scanning angle W is not zero. The skew distortion increases as the absolute value of the scanning angle w increases. It should be noted that the scanning angle w is defined as an angle formed between the center axis of the laser beam deflected by the polygonal mirror 14 and a reference light ray that points at the center of the scanning range on the photoconductive drum 18. That is, when the deflected laser beam points at the center of the scanning range, the scanning angle W is zero. The scanning angle W has a positive value at the side of the monitoring flat mirror 40 with respect to the reference light ray and has a negative value at the other side. The deflected beam of the scanning angle W=47.0° is incident on the monitoring mirror 40.

FIGS. 5A, 5B, 5C and 5D show the skews of the deflected laser beams at the scanning angle W=0.0°, W=20.0°, W=43.0° and W=47.0°, respectively. In each of the figures, a horizontal axis means the main scanning direction and a vertical axis means the auxiliary scanning direction.

Since the drawing anamorphic lens 16 acts as a correcting optical system for correcting effect of the skew of the deflected laser beam, the skew distortion has little effect on the beam spot formed on the photoconductive drum 18.

However, the monitor beam travels to the monitoring sensor 42 through the monitoring cylindrical lens 41 without passing the drawing anamorphic lens 16, which disturbs the wavefront of the monitor beam on the monitoring sensor 42 as shown in FIG. 6. The disturbance of the wavefront distorts the shape of the monitor beam spot on the monitoring sensor 42. FIGS. 7A, 7B and 7C are spot diagrams to show the shapes of the monitor beam spots at the point in front of the sensor by 2 mm (the side of the monitoring cylindrical leas 41), on the sensor and at the point in the rear of the sensor by 2 mm, respectively. The monitor beam is not sufficiently converged on the monitoring sensor 42 as shown in FIG. 7B, which blunts the rising edge of the signal generated by the monitoring sensor 42. Therefore, the scanning-start points determined by the signal from the monitoring sensor 42 may vary widely, which reduces printing quality.

SUMMARY OF THE INVENTION

It is therefore an object of the present invention to provide a monitoring optical system for a scanning optical device, which is capable of preventing disturbance of the wavefront of the monitor beam due to the skew distortion thereof, in spite of that the deflected laser beam is separated from the light beam incident on the deflector in the auxiliary scanning direction and that the monitoring beam is separated from the deflected laser beam without passing the correcting optical system.

For the above object, according to the present invention, there is provided an improved monitoring optical system for a scanning optical device in which a laser beam emitted from a laser source is incident on a deflector through a first anamorphic optical system such that the deflected laser beam is separated from the incident laser beam in a auxiliary scanning direction, and that the deflected laser beam is converged onto a drawing surface through a second anamorphic optical system that includes a correcting optical system for correcting an effect of skew of the laser beam. The monitoring optical system includes monitoring anamorphic lens for converging a monitor beam that is separated from the deflected laser beam at a separation point between the deflector and the correcting optical system and a monitoring sensor for detecting the monitor beam converged by the monitoring anamorphic lens and generating synchronizing signal when it detects the monitor beam. In the monitoring optical system, a main meridian that indicates a direction of main refractive power of the monitoring anamorphic lens is inclined with respect to a z-direction which is defined on a plan perpendicular to the monitor beam and which is perpendicular to a scanning direction of the monitor beam on the plane so that wavefront aberration on the monitoring sensor is minimized.

With this construction, since the inclination of the monitoring anamorphic lens compensates the effect of the skew distortion of the monitor beam, the monitor beam can be sufficiently converged onto the monitoring sensor, which sharpens the rising edge of the monitor signal, aligning the scanning-start points.

The monitoring anamorphic lens may be a cylindrical lens and a monitoring flat mirror may be mounted at the separation point for separating the monitor beam from the deflected laser beam.

Further, the present invention covers the scanning optical device having the above-defined monitoring optical system.

In the scanning optical device, the first anamorphic optical system may be a cylindrical lens having a positive refractive power only in the auxiliary scanning direction for forming a line-spread image near the deflector. The deflector may be a rotational polygonal mirror. The second anamorphic optical system may include a curved surface mirror for reflecting the deflected laser beam and for converging the deflected laser beam in a main scanning direction and a drawing anamorphic lens for converging the laser beam reflected by the curved surface mirror in the auxiliary scanning direction.

The correcting optical system may be the drawing anamorphic lens. In such a case, the optical axis of the drawing anamorphic lens is preferably offset with respect to the a reference light ray that points at the center of a scanning range of the deflected laser beam on the drawing surface in the auxiliary scanning direction such that a locus of the deflected laser beam on the drawing anamorphic lens is offset from the optical axis of the drawing anamorphic lens.

DESCRIPTION OF THE ACCOMPANYING DRAWINGS

DESCRIPTION OF THE EMBODIMENTS

A scanning optical device including a monitoring optical system according to an embodiment of the present invention will be described. The device of the embodiment is used, for example in an laser beam printer.

The printer in which the embodiment is applied forms an electrostatic latent image onto a photoconductive drum by scanning a laser beam, modulated by an input signal, on the drum.

Figure 1:
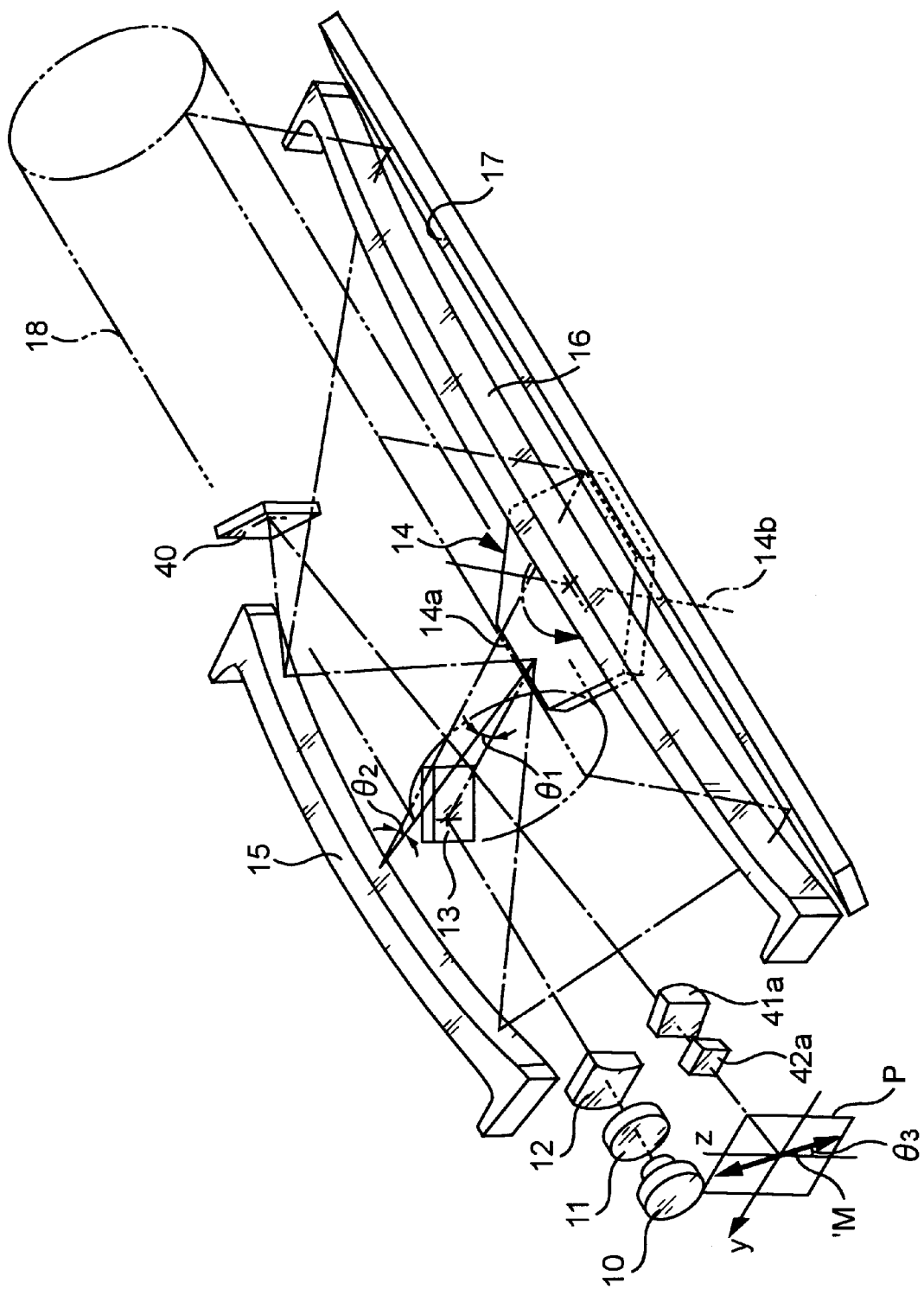
FIG. 1 is a perspective view of a scanning optical device including a monitoring optical system according to an embodiment of the present invention.

FIG. 1 is a perspective view of a scanning optical device including the monitoring optical system of the embodiment.

As shown in FIG. 1, the optical scanning device is arranged such that diverging light generated from a semiconductor laser 10 (laser source) is collimated by a collimator lens 11. The collimated beam then passes through a cylindrical lens 12 as a first anamorphic optical system, which converges the beam only in the auxiliary scanning direction. The converged beam is then reflected, at a substantially right angle, towards a polygonal mirror 14 by a flat mirror 13.

The polygonal mirror 14 is rotated by a motor around a rotation axis 14b, turning six reflecting surfaces 14a across the beam, thereby the laser beam scanning In the main scanning direction. The scanning beam is reflected and deflected by the polygonal mirror 14 at a first separation angle θ1 in the auxiliary scanning direction with respect to the laser beam incident on the polygonal mirror 14. Namely, the deflected laser beam is separated N from the incident laser beam in the auxiliary scanning direction at the reflection by the polygonal mirror 14.

The laser beam deflected by the polygonal mirror 14 is subsequently again reflected by a curved surface mirror 15 at a second separation angle θ2 with respect to the laser beam incident on the curved surface mirror 15, and directed to a drawing anamorphic lens 16 above the polygonal mirror 14.

The laser beam passing through the drawing anamorphic lens 16 is then reflected by an optical path bending mirror 17, and reaches the photoconductive drum 18 shown by two-dot chain line, scanning in the main scanning direction that is coincident with a generatrix of the photoconductive drum 18.

The laser beam forms a line-spread image, once converged in the auxiliary scanning direction by the cylindrical lens 12, on or near thee reflecting surface 14a of the polygonal mirror 14. The beam then again forms an image on the photoconductive drum 18, again converged by means of the optical power of the drawing anamorphic lens 16 in the auxiliary scanning direction. This structure prevents displacement of the scanning beam on the photoconductive drum 18 due to a facet error of the reflecting surface 14a.

The curved surface mirror 15 has positive power in the main scanning direction to converge the deflected laser beam in the main scanning direction. The drawing anamorphic lens 16 primarily has positive power in the auxiliary scanning direction to converge the laser beam reflected by the curved surface mirror 15 in the auxiliary scanning direction. The curved surface mirror 15 and the drawing anamorphic lens 16 constitute a second anamorphic optical system.

As described above, the laser beam deflected by the polygonal mirror 14 is separated from the laser beam incident thereon in the auxiliary scanning direction, which causes a skew distortion in the deflected laser beam when a scanning angle W is not zero. The drawing anamorphic lens 16 acts as a correcting optical system that corrects effect of the skew distortion of the deflected laser beam. That in, the optical axis of the drawing anamorphic lens 16 is offset with respect to a reference light ray that points at the center of the scanning range on the photoconductive drum 18 in the auxiliary scanning direction such that a locus of the deflected laser beam on-the drawing anamorphic lens 16 is offset from the optical axis of the drawing anamorphic lens 16. In the embodiment, the optical axis of the drawing anamorphic lens 16 is offset to the polygonal mirror 14 side with respect to the reference light ray.

By arranging the drawing anamorphic lens 16 to be offset in the auxiliary scanning direction, skew distortion, generated as the laser beam is incident on the reflection surfaces of the polygonal mirror 14 at an angle in the auxiliary scanning direction, is corrected. That is, since the laser beam incident on the drawing anamorphic lens 16 scans in accordance with a locus offset from the optical axis of the lens 16, the anamorphic lens 16 bends the laser beam asymmetrically about the optical axis in the auxiliary scanning direction. With this function, the skew distortion of the laser beam can be corrected. Therefore, the skew distortion has little effect on the beam spot formed on the photoconductive drum 18.

A monitoring flat mirror 40 is located between the curved surface mirror 15 and the drawing anamorphic lens 16. The monitoring flat mirror 40 separates a monitor beam from the deflected laser beam at a separation point outside of the scanning range. When the laser beam reflected by the curved surface mirror 15 reaches the end of the scanning range, the deflected laser beam is reflected as a monitor beam by the monitoring flat mirror 40 and is converged onto a monitoring sensor 42a through a monitoring cylindrical lens (a monitoring anamorphic lens) 41a. The monitoring sensor 42a generates a synchronizing signal to indicate the drawing-start timing of each scan in response to each detection of the monitor beam.

The laser beam reflected by the curved surface mirror is converged in the main scanning direction, but is diverged in the auxiliary scanning direction, so it is re-converged at the monitoring cylindrical lens 41a in the auxiliary scanning direction to form a spot on the monitoring sensor 42a.

In FIG. 1, a y-direction and a z-direction are defined in a plane P that is perpendicular to the monitor beam incident on the monitoring sensor 42a. The y-direction is a scanning direction of the monitor beam on the plane P and the z-direction Is perpendicular to the y-direction on the plane P. When the main meridian of the monitoring cylindrical lens 41a is projected onto the plane P, the direction of the main meridian M forms angle θ3 with respect to the z-direction. The main meridian is perpendicular to a generatrix of the monitoring cylindrical lens 41a and indicates a direction of main refractive power thereof.

Since the inclined arrangement of the monitoring cylindrical lens 41a matches the direction of the power of the monitoring cylindrical lens 41a with the skew of the monitor beam, the skewed monitor beam is well converged by the monitoring cylindrical lens 41a, and thus the effect of the skew distortion of the monitor beam is compensated. Accordingly, the monitor beam can be sufficiently converged onto the monitoring sensor 42a.

The angle θ3 is determined such that the wavefront aberration of the monitor beam on the monitoring sensor 42a is minimized. Particularly, the angle θ3 is determined according to the first and second separation angles θ1 and θ2, and the scanning angle Wm of the monitor beam scanning the monitoring sensor 42a. In the embodiment, θ1=8.0°, θ2=10.0° and Wm=47.0°, the effect of the skew distortion will be minimized when the angle θ3 is equal to 4.8°.

Figure 2:
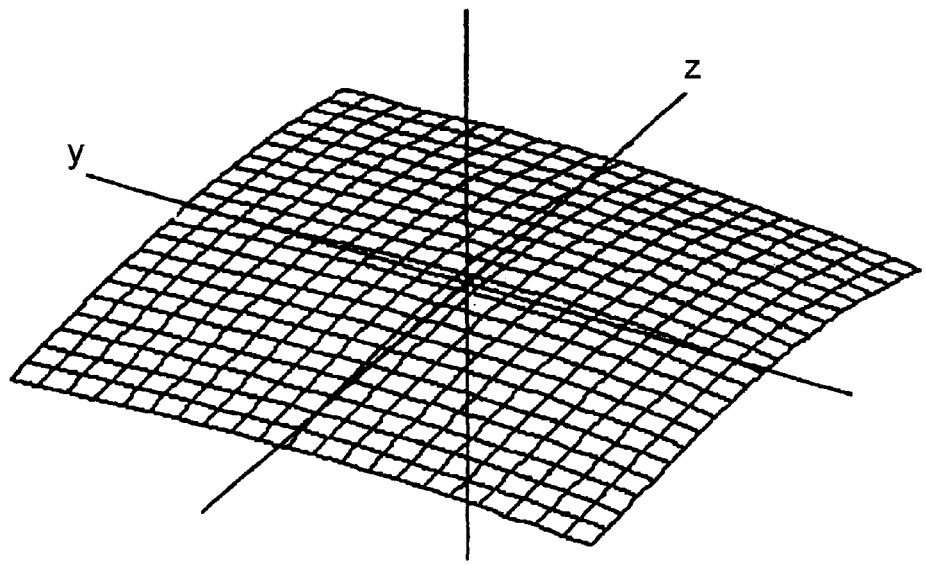
FIG. 2 shows wavefront of a monitor beam on a monitoring sensor in the optical system of FIG. 1.
Figures 3A, 3B, 3C:
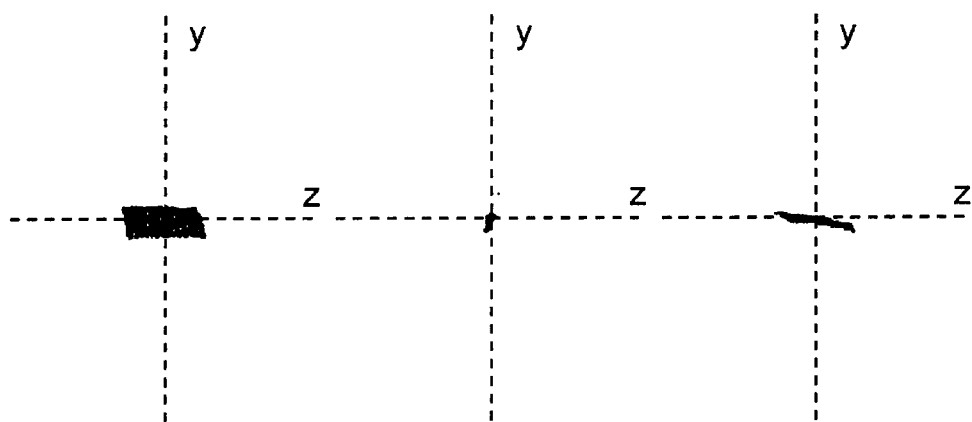
FIGS. 3A, 3B and 3C are spot diagrams of the monitor beam in the optical system of FIG. 1 at a point in front of the monitoring sensor by 2 mm, on the sensor and a point in the rear of the sensor by 2 mm, respectively.
Figure 4:
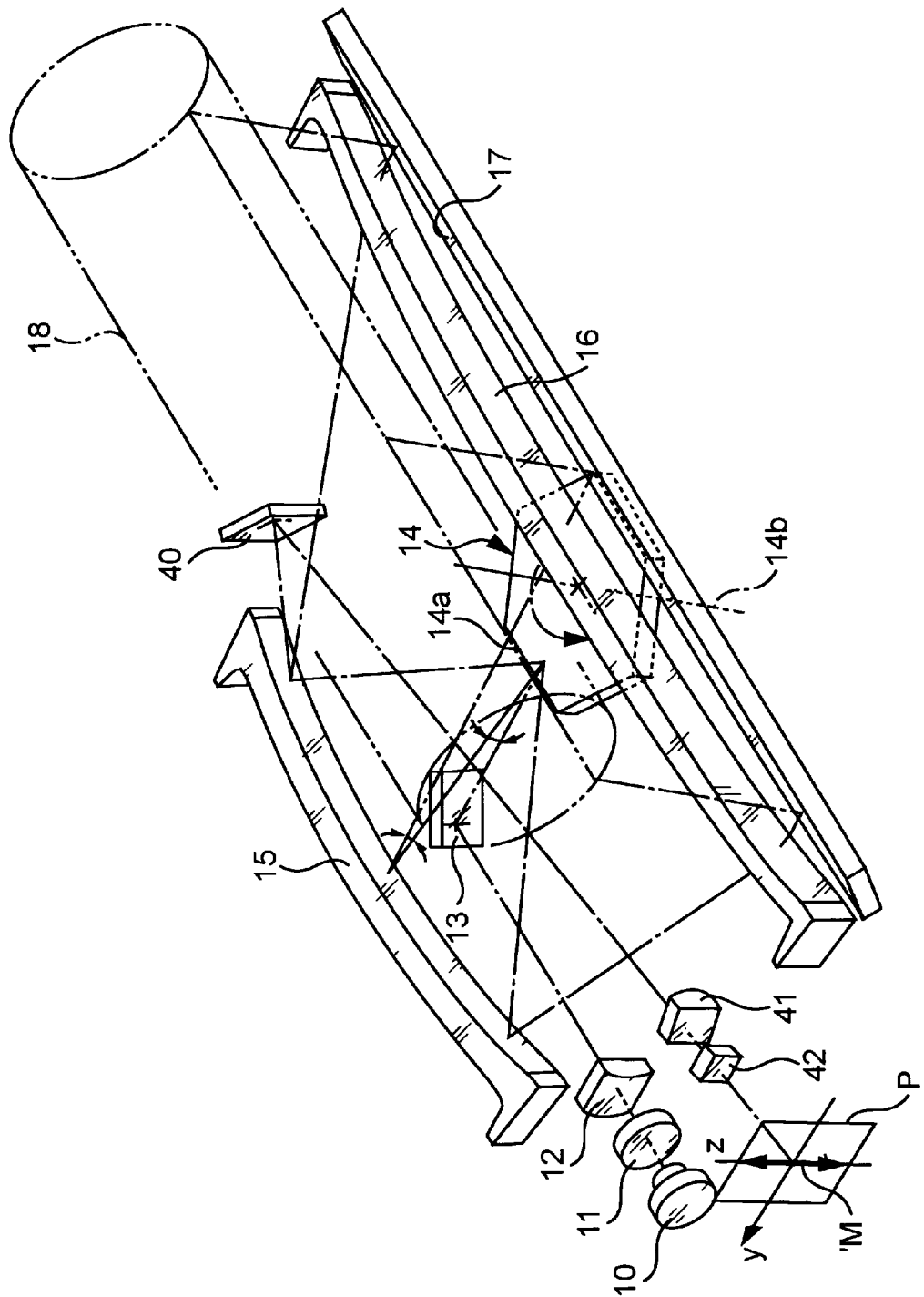
FIG. 4 is a perspective view of the scanning optical device including a conventional monitoring optical system.
Figure 5A:
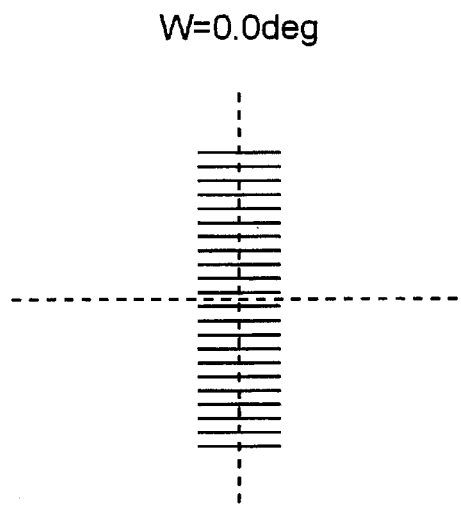
FIGS. 5A, 5B, 5C and 5D show the skews of the deflected laser beams at the scanning angle W=0.0°, W=20.0°, W=43.0° and W=47.0°, respectively.
Figure 5B:
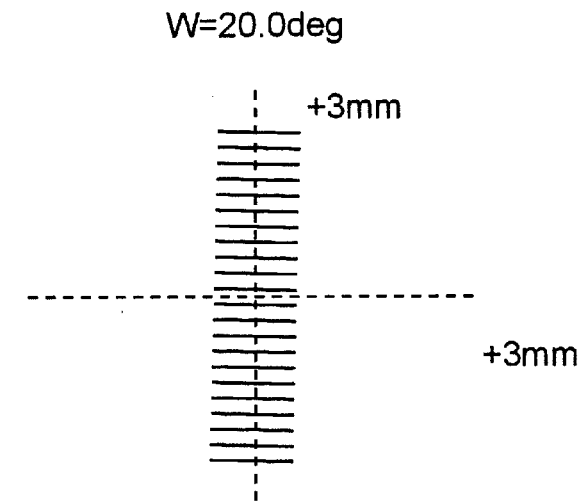
Figure 5C:
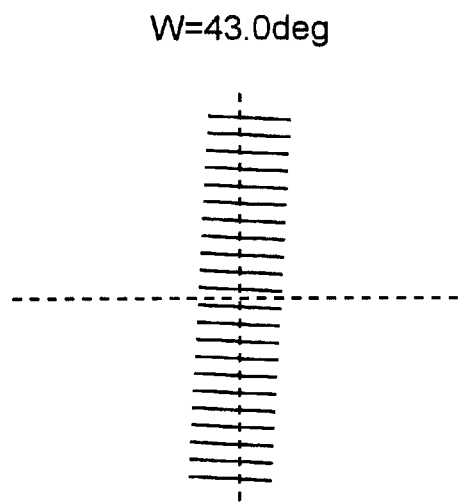
Figure 5D:
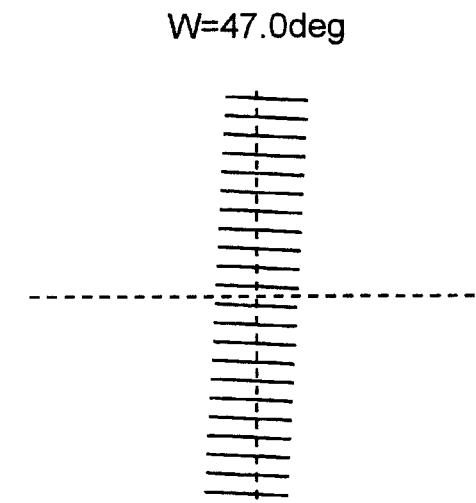
Figure 6:
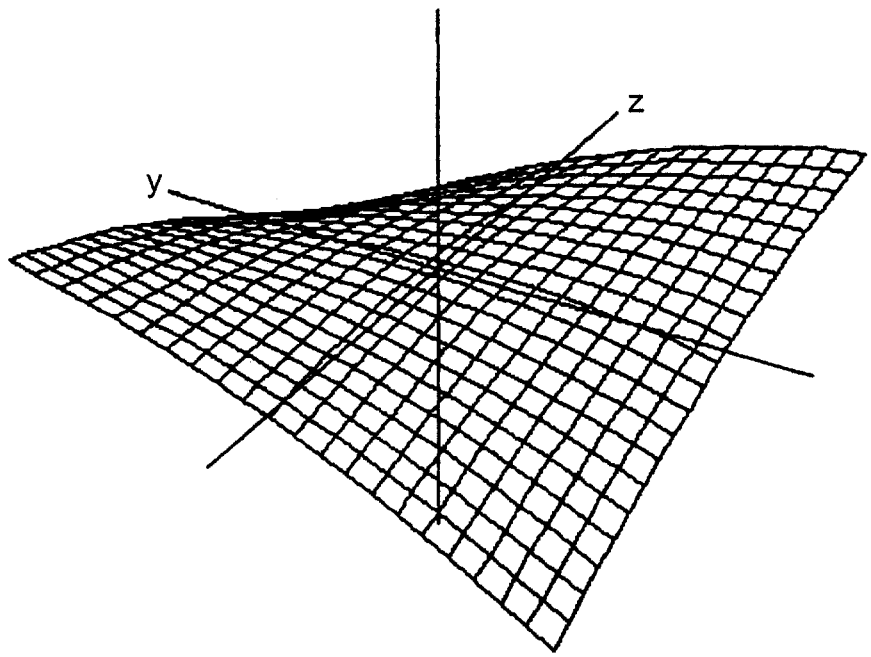
FIG. 6 shows wavefront of a monitor beam on a monitoring sensor in the optical system of FIG. 4.
Figures 7A, 7B, 7C:
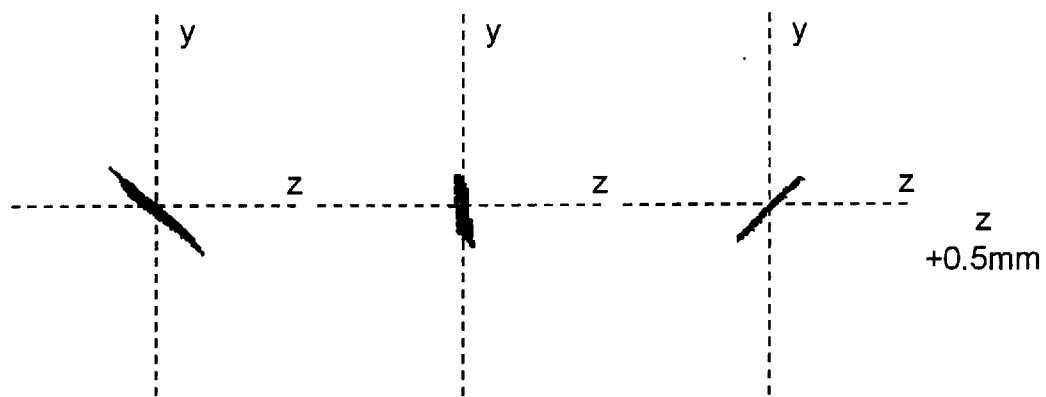
FIGS. 7A, 7B and 7C are spot diagrams of the monitor beam in the optical system of FIG. 4 at a point in front of the monitoring sensor by 2 mm, on the sensor and a point in the rear of the sensor by 2 mm, respectively.

With this setting of the angles, the wavefront of the monitor beam on the monitoring sensor 42a becomes substantially flat as shown in FIG. 2. Thus, the shape of the monitor beam spot on the monitoring sensor 42a is not distorted. FIGS. 3A, 3B and 3C are spot diagrams to show the shapes of the monitor beam spots at the point in front of the sensor by 2 mm (the side of the monitoring. cylindrical lens 41a), on the sensor and at the point in the rear of the sensor by 2 mm, respectively. The monitor beam is sufficiently converged on the monitoring sensor 42a as shown in FIG. 3B, which sharpens the rising edge of the signal generated by the monitoring sensor 42a. Therefore, the scanning-start points determined by the signal from the monitoring sensor 42a can be aligned, which improves printing quality.

The present disclosure relates to the subject matter contained in Japanese Patent Application No. HEI 11-010546, filed on Jan. 19, 1999, which is expressly incorporated herein by reference in its entirety.

What is claimed is:

1. A monitoring optical system for a scanning optical device in which a laser beam emitted from a laser source is incident on a deflector through a first anamorphic optical system, such that the deflected laser beam is separated from the incident laser beam in a auxiliary scanning direction, and that the deflected laser beam is converged onto a drawing surface through a second anamorphic optical system that includes a correcting optical system for correcting an effect of skew of said laser beam; said monitoring optical system comprising:

a monitoring anamorphic lens for converging a monitor beam that is separated from said deflected laser beam at a separation point between said deflector and said correcting optical system; and a monitoring sensor for detecting said monitor beam converged by said monitoring anamorphic lens, said monitoring sensor generating synchronizing signal when it detects said monitor beam;

wherein a main meridian that indicates a direction of main refractive power of said monitoring anamorphic lens is inclined with respect to a z-direction on a plan perpendicular to said monitor beam so that wavefront aberration on said monitoring sensor is minimized, said z-direction being perpendicular to a scanning direction of said monitor beam on said plane.

2. The monitoring optical system according to claim 1, wherein said monitoring anamorphic lens is a cylindrical lens.

3. The monitoring optical system according to claim 1, further comprising a monitoring flat mirror for separating said monitor beam from said deflected laser beam at said separation point.

4. A scanning optical device comprising:

a laser source for emitting a laser beam;

a deflector for deflecting said laser beam, the deflected laser beam being separated from the incident laser beam in a auxiliary scanning direction;

a first anamorphic optical system located between said laser source and said deflector;

a second anamorphic optical system for converging said deflected laser beam onto a drawing surface, said second anamorphic optical system including a correcting optical system for correcting an effect of skew of said laser beam;

a monitoring anamorphic lens for converging a monitor beam that in separated from said deflected laser beam at a separation point between said deflector and said correcting optical system; and a monitoring sensor for detecting said monitor beam converged by said monitoring anamorphic lens, said monitoring sensor generating synchronizing signal when it detects said monitor beam;

wherein a main meridian that indicates a direction of main refractive power of said monitoring anamorphic lens is inclined with respect to a z-direction on a plan perpendicular to said monitor beam so that wavefront aberration on said monitoring sensor is minimized, said z-direction being perpendicular to a scanning direction of said monitor beam on said plane.

5. The scanning optical device according to claim 4, wherein said monitoring anamorphic lens is a cylindrical lens.

6. The scanning optical device according to claim 4, wherein said first anamorphic optical system in a cylindrical lens having a positive refractive power only in the auxiliary scanning direction for forming a line-spread image near said deflector.

7. The scanning optical device according to claim 4, wherein said deflector is a rotational polygonal mirror.

8. The scanning optical device according to claim 4, wherein said second anamorphic optical system includes a curved surface mirror for reflecting said deflected laser beam and for converging said deflected laser beam in a main scanning direction and a drawing anamorphic lens for converging the laser beam reflected by said curved surface mirror in the auxiliary scanning direction.

9. The scanning optical device according to claim 8, wherein said correcting optical system is said drawing anamorphic lens.

10. The scanning optical device according to claim 9, wherein the optical axis of said drawing anamorphic lens is offset with respect to a reference light ray that points at the center of a scanning range of the deflected laser beam on said drawing surface in the auxiliary scanning direction such that a locus of said deflected laser beam on said drawing anamorphic lens is offset from the optical axis of said drawing anamorphic lens.

* * * * *